(12) United States Patent
Imamoto et al.

(10) Patent No.: US 6,830,248 B2
(45) Date of Patent: Dec. 14, 2004

(54) MAGNETIC FLUID SEALER AND METHOD FOR MOUNTING MAGNETIC FLUID SEALER

(75) Inventors: Yoshimi Imamoto, Fujisawa (JP); Hiroshi Anzai, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/311,630

(22) PCT Filed: Jun. 21, 2001

(86) PCT No.: PCT/JP01/05328
§ 371 (c)(1),
(2), (4) Date: Dec. 18, 2002

(87) PCT Pub. No.: WO01/98811
PCT Pub. Date: Dec. 27, 2001

(65) Prior Publication Data
US 2003/0168816 A1 Sep. 11, 2003

(30) Foreign Application Priority Data

Jun. 21, 2000 (JP) .................................... 2000-186364
Oct. 12, 2000 (JP) .................................... 2000-312621

(51) Int. Cl.⁷ .............................................. F16J 15/43
(52) U.S. Cl. .................. 277/410; 359/513; 359/601
(58) Field of Search ................. 359/513, 600, 359/614, 738, 611, 601; 277/410

(56) References Cited

U.S. PATENT DOCUMENTS

| | | | |
|---|---|---|---|
| 3,910,687 A | 10/1975 | Iwata | |
| 4,598,914 A | 7/1986 | Furumura et al. | |
| 5,365,373 A | * 11/1994 | Tanaka | 359/601 |
| 5,450,239 A | * 9/1995 | Uziie et al. | 359/601 |
| 6,024,457 A | 2/2000 | Kawai et al. | |
| 6,733,143 B1 | * 5/2004 | Anzai et al. | 359/513 |

FOREIGN PATENT DOCUMENTS

| | | |
|---|---|---|
| JP | 56-42766 | 4/1981 |
| JP | 63-178672 | 11/1988 |
| JP | 63-285369 | 11/1988 |
| JP | 64-39926 | 3/1989 |
| JP | 2-118504 | 5/1990 |
| JP | 4-101868 | 9/1992 |
| JP | 5-94578 | 12/1993 |
| JP | 7-77282 | 3/1995 |
| JP | 8-146501 | 6/1996 |
| JP | 10-31146 | 2/1998 |
| JP | 11-2751 | 1/1999 |

* cited by examiner

Primary Examiner—William L. Miller
(74) Attorney, Agent, or Firm—Jacobson Holman PLLC

(57) ABSTRACT

A high-performance magnetic fluid sealer which maintains light-shielding property even when an interval change of a gap is large and a method for easily mounting a magnetic fluid sealer. A pair of annular magnets are supported by levitation from a lens barrel by magnetic levitation force which a magnetic fluid imparts in a fitting groove in the inner peripheral face of a lens barrel. Therefore, even when the lens barrel is greatly eccentric to the lens barrel, the pair of annular magnets move radially so as to keep a constant gap from the lens barrel with the magnetic fluid.

11 Claims, 6 Drawing Sheets

MAGNETIC FLUID SEALER AND METHOD FOR MOUNTING MAGNETIC FLUID SEALER

This is a nationalization of PCT/JP01/05328, filed Jun. 21, 2001 and published in Japanese.

TECHNICAL FIELD

The present invention relates to a magnetic fluid sealer that employs magnetic fluids and a method for mounting the magnetic fluid sealer, which are applied to, for example, a light-shielding device such as one used in a zoom lens unit of a camera, in which light-shielding is performed by using magnetic fluids.

BACKGROUND ART

Conventionally, when a zoom lens unit of a camera or the like is subjected to light-shielding, a contact-type sealer that uses a contact-type sealing member such as silicon rubber is employed as a light-shielding device. Slide resistance of the contact-type shielding member of such a contact-type sealer is considerably small as compared with that of a normal oil sealing member.

However, as miniaturization and expansion in functionality of a camera have advanced in recent years, power saving of each of the units that compose the camera has become a problem. In order to reduce power consumption which is required at the time when a zoom lens is driven, the reduction of slide resistance with respect to a shielding member is further required.

However, in the conventional light-shielding device that employs the contact-type sealing member, sliding is effected by contact made between solids. As a result, there is a limitation inevitably placed on the extent of reduction in slide resistance of the contact-type sealing member.

Thus, the applicant has devised a light-shielding device which is a magnetic fluid sealer for conducting the light-shielding by using magnetic fluids as shown in FIG. 7.

The conventional light-shielding device that employs magnetic fluids will be described below with reference to FIG. 7. In FIG. 7, lens barrels 5 and 6 aligned as double barrels constitute a zoom lens unit of a compact camera, and a lens 7 and a shutter unit 8 are disposed inside the lens barrel 6.

A light-shielding device 1 includes a pair of annular magnets 2 and 3 which are mutually inversely polarized in the radial direction, and disposed in the inner peripheral face of the lens barrel 5 and a magnetic fluid 4 held in a gap between the inner peripheral face (magnetic pole) of the annular magnets 2 and 3 and the outer peripheral face of the lens barrel 6 by a magnetic circuit formed by the pair of annular magnets 2 and 3.

The light-shielding device 1 slides through the contact made between the magnetic fluid 4 and the lens barrel 6, that is, between a fluid and a solid, thereby remarkably reducing the slide resistance as compared with the conventional light-shielding device employing the contact-type shielding member.

However, in the above-described conventional technique, there is a problem as described below.

In the light-shielding device 1 that employs magnetic fluids as shown in FIG. 7, the surface of the magnetic fluid 4 is held substantially along the isomagnetic field lines of the spatial magnetic field that is generated by the pair of annular magnets 2 and 3.

Accordingly, even when the gap between the lens barrels 5 and 6 is changed due to eccentricity or the like, if the outer peripheral face of the lens barrel 6 remains within the area that is covered by the spatial magnetic field generated by the pair of annular magnets 2 and 3, and the surface of the magnetic fluid 4 is held substantially along the isomagnetic field lines that are in contact with the outer peripheral face of the lens barrel 6 (when the magnetic fluid 4 of the amount required for achieving the above is present), the magnetic fluid 4 is capable of completely light-shielding the gap between the lens barrels 5 and 6 as shown in FIG. 8.

However, when the maximum interval of the gap between the lens barrels 5 and 6 goes beyond the area that is covered by the spatial magnetic field generated by the pair of annular magnets 2 and 3, or when the magnetic fluid 4 of the amount sufficient to block the gap between the lens barrels 5 and 6 is not present, the magnetic fluid 4 cannot perform light-shielding with respect to the gap between the lens barrels 5 and 6 as shown in FIG. 9.

In order to avoid the state shown in FIG. 9 and to maintain the light-shielding property of the light-shielding device 1 even when the gap between the lens barrels 5 and 6 is changed due to eccentricity or the like, it is necessary that the pair of annular magnets 2 and 3 are changed to those that produce more intense magnetic force to elevate the intensity of the spatial magnetic field, or that the amount of the magnetic fluid 4 that is retained in the gap between the lens barrels 5 and 6 is increased. However, enlargement of the pair of annular magnets 2 and 3 is caused to produce an intense magnetic force, and when the amount of the magnetic fluid 4 is increased, the slide resistance is increased due to the increased contact area between the magnetic fluid 4 and the lens barrel 6. Therefore, these methods are not preferred.

The present invention has been made in view of the above problem inherent in the prior art. Accordingly, an object of the present invention is to provide a high-performance magnetic fluid sealer, which is capable of maintaining light-shielding property even when an interval change of a gap is large, and a method for easily mounting the magnetic fluid sealer.

DISCLOSURE OF THE INVENTION

The present invention adopts the following construction to solve the above problem.

In order to attain the above object, a magnetic fluid sealer of the present invention is a magnetic fluid sealer for preventing light leakage through a gap between two members mounted so as to be relatively movable with respect to each other, comprising: a magnetic circuit forming means which includes a magnetic force producing means for producing magnetic force and a pair of magnetic pole units opposing one of the two members, and forms a magnetic circuit that passes through the gap; and a magnetic fluid that is magnetically retained in the pair of magnetic pole units of the magnetic circuit forming means, which contacts with one of the above-mentioned members to thereby conduct light-shielding with respect to the gap, characterized in that the magnetic circuit forming means is provided so as to be relatively movable in response to an interval change of the gap.

Thus, even when the interval change of the gap between the two members is caused due to eccentricity or the like, the gap between the magnetic circuit forming means that retains the magnetic fluid and one of the two members can be kept constant. Thus, the area in which the magnetic fluid is in contact with one of the members is not enlarged, whereby the slide resistance of the magnetic fluid sealer can be always kept constant regardless of the eccentricity amount.

Accordingly, the light-shielding property can be maintained even in the case where the interval change of the gap is large, without enlarging a magnetic force producing means in response to the eccentricity amount to obtain increased magnetic force or increasing the amount of the magnetic fluid.

It is preferable that the magnetic circuit forming means is provided so as to be movable in a vertical direction with respect to the one of the two members, within a fitting groove that is provided in the other one of the two members.

Accordingly, the magnetic circuit forming means is supported by levitation from one of the members by magnetic levitation force which the magnetic fluid imparts in the fitting groove. Even in the eccentric state, the magnetic circuit forming means can radially move so as to keep a constant gap from one of the members with the magnetic fluid.

It is preferable that a leakage prevention member for preventing a leakage of the magnetic fluid in an axial direction is provided in at least one of the side surfaces of the magnetic circuit forming means in an axial direction.

Accordingly, a leakage of the magnetic fluid in an axial direction can be prevented by the leakage prevention member.

It is preferable that the surface of the one of the members is coated with a wettability reducing member for reducing wettability with the magnetic fluid.

Thus, the magnetic fluid that is in contact with one of the members can be prevented from wetting the surface of one of the members, thereby being capable of preventing reduction in the amount of the magnetic fluid that is retained in the magnetic pole units. As a result, light-shielding can be performed for a long period of time.

It is preferable that the magnetic circuit forming means is provided in a manner such that the pair of magnetic pole units are formed in a pair of the magnetic force producing means that are coupled while being mutually inversely polarized.

Thus, the magnetic circuit forming means may be simply constructed, thereby being excellent in its manufacturing property and assembling property.

It is preferable that the magnetic fluid sealer is disposed in a zoom lens unit of a camera.

Accordingly, the slide resistance of the zoom lens unit of a camera can be reduced, the power consumption amount that is required for performing zooming with the zoom lens unit or the like may also be reduced, thereby being capable of attaining power conservation of the camera. Also, the eccentricity following property of the zoom lens unit is enhanced to save space thereof, thereby being capable of achieving miniaturization of the camera.

It is a magnetic fluid sealer that is provided in a gap between two members mounted so as to be relatively movable with respect to each other, comprising:

a magnetic circuit forming means which includes a magnetic force producing means for producing magnetic force, and forms a magnetic circuit that passes through the gap; and a magnetic fluid that is magnetically retained by magnetic flux passing through the gap of the magnetic circuit formed by the magnetic circuit forming means, which contacts with one of the two members to thereby seal the gap, characterized in that:

the magnetic fluid sealer further comprises a sleeve mounted to the other one of the two members and in which a fitting groove is formed at the position opposing the one of the members; and the magnetic circuit forming means is arranged in the fitting groove of the sleeve so as to be movable in a vertical direction with respect to the one of the members.

Therefore, the magnetic circuit forming means is supported by levitation from one of the members by magnetic levitation force which the magnetic fluid imparts in the fitting groove of the sleeve. Thus, even in the eccentric state, the magnetic circuit forming means can radially move so as to keep a constant gap from one of the members with the magnetic fluid.

Accordingly, the area in which the magnetic fluid is in contact with one of the members is not enlarged, and the slide resistance of the magnetic fluid sealer can be always kept constant regardless of the eccentricity amount, so that light-shielding property or dust-proof property can be maintained even in the case where the interval change of the gap is large.

It is preferable that a leakage prevention member for preventing a leakage of the magnetic fluid in an axial direction is provided in at least one of the side surfaces of the magnetic circuit forming means in an axial direction.

Accordingly, a leakage of the magnetic fluid in an axial direction can be prevented by the leakage prevention member. Further, entering of foreign materials into the magnetic fluid from the outside can be also securely prevented.

It is preferable that, when mounting the magnetic fluid sealer between the two members, the sleeve in which retaining of the magnetic fluid and disposing of the magnetic circuit forming means into the fitting groove have been completed is mounted in advance to a jig having a magnetic fluid contact portion whose surface configuration is substantially the same as that of the one of the members, and the sleeve is slid to amounting portion of the two members while making an end portion of the magnetic fluid contact portion of the jig be opposed to an end portion of the one of the members, to thereby mount it to the other one of the members.

Thus, prior to mounting to the mounting portion of the two members, the magnetic fluid can be filled in advance. Then, mounting can be effected by simply sliding the sleeve to the mounting portion, thereby achieving excellent mounting operability. Also, the manufacturer of the magnetic fluid sealer can fill magnetic fluids in advance before shipping the magnetic fluid sealer, so that the manufacturer of the magnetic fluid sealer can manage the filling amount of magnetic fluids.

It is preferable that the surface of the magnetic fluid contact portion of the jig remains in the state in which its wettability with magnetic fluids has been reduced.

Accordingly, adherence of magnetic fluids with respect to the magnetic fluid contact portion of the jig can be reduced, thereby being capable of strict managing the filling amount of magnetic fluids before performing the mounting.

It is preferable that the magnetic circuit forming means is provided in a manner such that the pair of magnetic pole units are formed in a pair of the magnetic force producing means that are coupled while being mutually inversely polarized in a vertical direction with respect to the one of the members.

Therefore, the magnetic circuit forming means may be simply constructed, thereby being excellent in its manufacturing property and assembling property, while at the same time being capable of producing intense magnetic force.

A method for mounting a magnetic fluid sealer of the present invention is a method of mounting a magnetic fluid sealer between two members, the magnetic fluid sealer that is provided in a gap between the two members mounted so as to be relatively movable with respect to each other and comprising: a magnetic circuit forming means which includes a magnetic force producing means for producing magnetic force and forms a magnetic circuit that passes through the gap; a magnetic fluid that is magnetically retained by magnetic flux passing through the gap of the magnetic circuit formed by the magnetic circuit forming means, which contacts with one of the two members to thereby seal the gap; and a sleeve mounted to the other one of the two members and in which the the magnetic circuit forming means is disposed, characterized by comprising:

mounting in advance the sleeve in which retaining of the magnetic fluid and disposing of the magnetic circuit forming means have been completed, to a jig having a magnetic fluid contact portion whose surface configuration is substantially the same as that of the one of the members; and sliding the sleeve to a mounting portion of the two members while making an end portion of the magnetic fluid contact portion of the jig be opposed to an end portion of the one of the members, to thereby mount it to the other one of the members.

Accordingly, prior to mounting to the mounting portion of the two members, the magnetic fluid can be filled in advance. Then, mounting can be effected by simply sliding the sleeve to the mounting portion, thereby achieving excellent mounting operability. Also, the manufacturer of the magnetic fluid sealer can fill magnetic fluids in advance before shipping the magnetic fluid sealer, so that the manufacturer of the magnetic fluid sealer can manage the filling amount of magnetic fluids.

It is preferable that the surface of the magnetic fluid contact portion of the jig remains in the state in which its wettability with magnetic fluids has been reduced.

Accordingly, adherence of magnetic fluids with respect to the magnetic fluid contact portion of the jig can be reduced, thereby being capable of strict managing the filling amount of magnetic fluids before performing the mounting.

It is preferable that a fitting groove is formed in the sleeve at a position opposing the one of the members and that the magnetic circuit forming means is arranged in the fitting groove of the sleeve so as to be movable in a vertical direction with respect to the one of the members.

Therefore, the magnetic circuit forming means is supported by levitation from one of the members by magnetic levitation force which the magnetic fluid imparts in the fitting groove of the sleeve. Thus, even in the eccentric state, the magnetic circuit forming means can radially move so as to keep a constant gap from one of the members with the magnetic fluid.

Thus, the area in which the magnetic fluid is in contact with one of the members is not enlarged, and the slide resistance of the magnetic fluid sealer can be always kept constant regardless of the eccentricity amount, so that light-shielding property or dust-proof property can be maintained even in the case where the interval change of the gap is large.

It is preferable that a leakage prevention member for preventing a leakage of the magnetic fluid in an axial direction is provided in at least one of the side surfaces of the magnetic circuit forming means in an axial direction.

Therefore, a leakage of the magnetic fluid in an axial direction can be prevented by the leakage prevention member. Further, entering of foreign materials into the magnetic fluid from the outside can be also securely prevented.

BEST MODE FOR CARRYING OUT THE INVENTION (Embodiment Mode 1)

Figure 1:
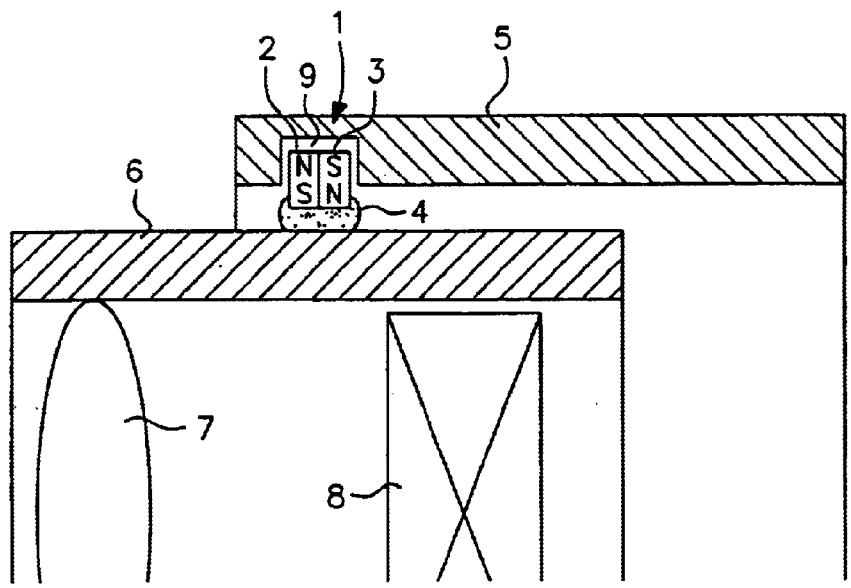
FIG. 1 is a half-sectional view showing a light-shielding device according to Embodiment Mode 1.
Figure 2:
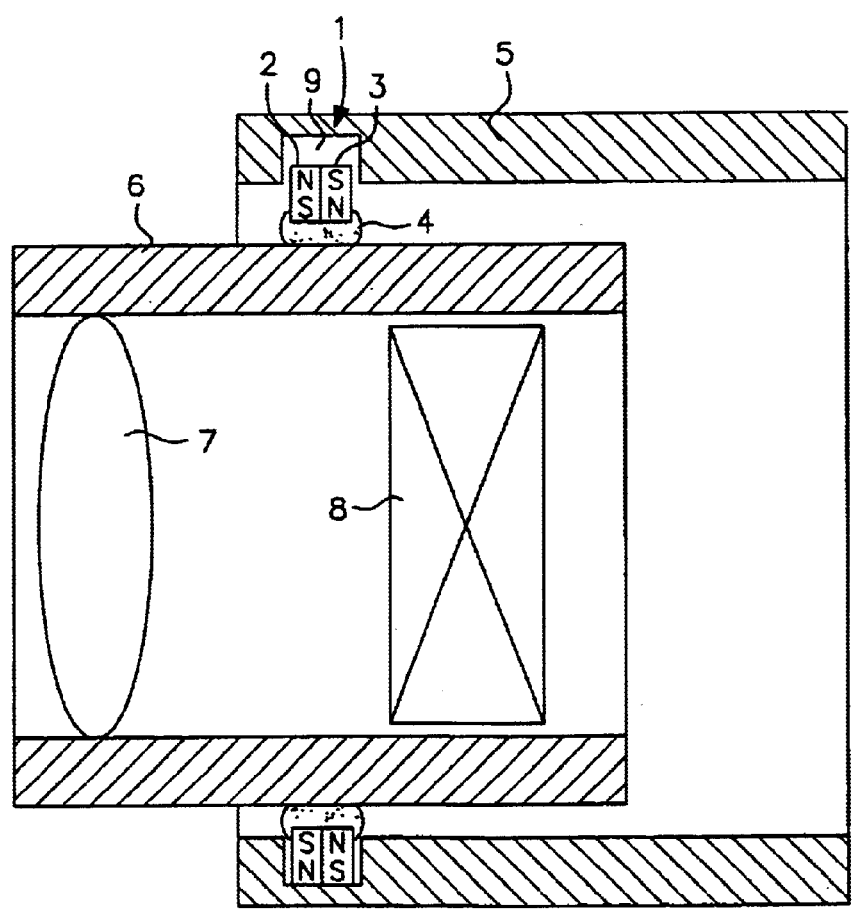
FIG. 2 is a sectional view showing an eccentric state of the light-shielding device according to Embodiment Mode 1.

A structure in which a light-shielding device is used for a compact camera as a magnetic fluid sealer according to Embodiment Model will be described with reference to FIGS. 1 and 2. Incidentally, FIG. 1 and FIG. 2 illustrate a schematically enlarged zoom lens unit of a compact camera.

First, the structure of the light-shielding device will be described with reference to FIG. 1. The zoom lens unit of the compact camera shown in FIG. 1 is provided with lens barrels 5 and 6 that are aligned as double barrels and protruded from a main body of the camera so as to be movable, and a lens 7 and a shutter unit 8 which are disposed in an inside portion of the innermost lens barrel 6.

The zoom lens unit is provided with a light-shielding device 1 between lens barrels 5 and 6 of non-magnetic substances so that the invasion of light and dust is prevented at the time when the zoom lens unit performs up-and-down motion through zooming or the like. Note that, the light-shielding device 1 is also applicable to a gap between the lens barrel 5 and the main body of the camera and the like in a similar manner.

The light-shielding device 1 is structured by a pair of annular magnets 2 and 3 (magnetic force producing means) that are mutually inversely polarized in the radial direction and are disposed at the inner peripheral face of the lens barrel 5, and a magnetic fluid 4 that is retained on the inner peripheral end portions of the pair of annular magnets 2 and 3 (magnetic pole units).

Note that, in this case, a magnetic circuit forming means is constituted of the pair of annular magnets 2 and 3 alone.

In the pair of annular magnets 2 and 3, the end surfaces in an axial direction, which are faced with each other in a state mutually inversely polarized in the radial direction, are coupled to each other, and the magnetic fluid 4 is magnetically retained on the inner peripheral end portions of the pair of annular magnets 2 and 3 in accordance with the magnetic field distribution between the annular magnets 2 and 3.

The pair of annular magnets 2 and 3 are arranged at in annular fitting groove that is provided in the inner peripheral face of the lens barrel 5 so as to be radially movable.

A gap 9 that corresponds to the eccentricity amount of the lens barrel 6 with respect to the lens barrel 5 is formed between the outer peripheral faces of the pair of annular magnets 2 and 3 that are arranged in the fitting groove and the groove bottom surface of the fitting groove. The gap 9 has a depth in a radial direction, which is equal to or greater than the eccentricity amount of the lens barrel 6 with respect to the lens barrel 5.

That is, the depth of the gap 9 is set so that the pair of annular magnets 2 and 3 do not go outside the interior of the fitting groove of the lens barrel 5 and the outer peripheral end portions of the pair of annular magnets 2 and 3 do not contact with the groove bottom surface of the fitting groove of the lens barrel 5 even when the lens barrel 6 is eccentric.

Also, permanent magnets that are made of organic materials filled with metals or magnetic powders or the like are used as the pair of annular magnets 2 and 3.

On the other hand, substances obtained by dispersing fine particles such as $Fe_3O_4$ into oil, water or organic solvents, etc., so as to be formed in a colloidal state are used as the magnetic fluid 4.

Incidentally, when the outer peripheral face of the lens barrel 6 is coated with materials that cause wettability with respect to the magnetic fluid 4 to be degraded (wettability reducing member), the magnetic fluid 4 that is magnetically retained on the inner peripheral end portion of the pair of annular magnets 2 and 3 is prevented from being remained on the outer peripheral face of the lens barrel 6 in accordance with zooming or the like and further the retention of the magnetic fluid 4 is improved, which is preferable.

The light-shielding device 1 covers the gap between the lens barrels 5 and 6 through the magnetic fluid 4 that brings the inner peripheral end portion of the pair of annular magnets 2 and 3 into contact with the outer peripheral face of the lens barrel 6, to thereby implement light-shielding.

In this case, the pair of annular magnets 2 and 3 are supported by levitation from the lens barrel 6 by magnetic levitation force that the magnetic fluid 4 imparts in the fitting groove of the inner peripheral face of the lens barrel 5.

This is because, in the interior of the magnetic fluid 4 which is positioned in the vicinity of the pair of annular magnets 2 and 3, there is generated a pressure gradient that becomes higher as approaching the pair of annular magnets 2 and 3 through magnetic force produced by the pair of annular magnets 2 and 3.

Thus, there is exerted force such that the lens barrel 6 of non-magnetic substance is pushed out toward the low pressure direction, that is, the center axis, by the pressure gradient of the interior of the magnetic fluid 4, and the pair of annular magnets 2 and 3 are levitated with respect to the lens barrel 6 as a reaction thereof.

Even when the lens barrel 6 is greatly eccentric to the lens barrel 5, as shown in FIG. 2, the pair of annular magnets 2 and 3 radially move so that the gap from the lens barrel 6 is kept constant by the magnetic fluid 4.

In other words, the pair of annular magnets 2 and 3 are supported by levitation by the magnetic fluid 4, to thereby move radially in accordance with eccentricity of the lens barrel 6.

Also, in this case, even when the pair of annular magnets 2 and 3 move radially, they do not go outside the fitting groove of the lens barrel 5, resulting in that the gap between the lens barrels 5 and 6 remains in the light-shielded state.

Further, even when the pair of annular magnets 2 and 3 move radially, they do not come into contact with the groove bottom surface of the fitting groove of the lens barrel 5, the gap between the pair of annular magnets 2 and 3 and the lens barrel 6 is not reduced, and thus, the area in which the magnetic fluid 4 is in contact with the outer peripheral face of the lens barrel 6 is not enlarged.

Consequently, the slide resistance of the light-shielding device 1 is always kept constant regardless of the eccentricity amount of the lens barrel 6.

Therefore, this embodiment mode is capable of providing the light-shielding device 1 that keeps the light-shielding property even in the eccentric state, without the need of increasing the sizes of the pair of annular magnets 2 and 3 in response to the eccentricity amount of the lens barrel 6 to intensify magnetic force thereof or increasing the amount of the magnetic fluid 4 is increased.

Also, the slide resistance of the light-shielding device 1 is always kept constant regardless of the eccentricity amount, resulting in that as a driving device for zooming the zoom lens unit or the like, any device may be used as long as it has constant driving force, thereby achieving reduction of the power consumption amount.

(Evaluation of Light-Shielding Property)

There is compared the light-shielding property in the eccentric state between the light-shielding device 1 according to Embodiment Mode 1 having the above construction and the conventional light-shielding device using the magnetic fluid 4 providing with a pair of annular magnets 2 and 3 that are fixed to the lens barrel 5.

The common conditions are set as follows:

the inside diameter of the lens barrel 5: F 31.0 mm;
the outside diameter of the lens barrel 6: F 30.6 mm;
the gap between the lens barrel 5 and the lens barrel 6: 0.2 mm;
the eccentricity amount of the lens barrel 6 with respect to the lens barrel 5: 0.15 mm;
the outside diameter of the pair of annular magnets 2 and 3: F 32.0 mm;
the inside diameter of the pair of annular magnets 2 and 3: F 31.0 mm;
the width of the pair of annular magnets 2 and 3 in an axial direction: 0.8 mm; and
the amount of the magnetic fluid 4: 15 μl.

Also, as a condition only of the light-shielding device 1 according to this embodiment mode, it is set that the groove diameter of the fitting groove of the lens barrel 5: F 32.3 mm.

In terms of these two light-shielding devices, the light-shielding properties in the eccentric state are compared under the above-described conditions, and the results are indicated below.

In the conventional light-shielding device, the light-shielding property is kept until the eccentricity amount exceeds 0.12 mm. However, when the eccentricity amount exceeds 0.12 mm, light leakage occurs at the area in which there is a wide space in the gap between the lens barrels 5 and 6.

In the light-shielding device 1 according to this embodiment mode, the light-shielding property is kept even in the state where the eccentricity amount reaches 0.15 mm.

Thus, it is confirmed by the above comparison that the light-shielding device 1 according to this embodiment mode maintains the light-shielding property in the eccentric state even when the eccentricity amount becomes large as compared with the conventional light-shielding device.

Note that it may be constructed so that the pair of annular magnets 2 and 3 are disposed in the fitting groove that is arranged at the outer peripheral face of the internal lens barrel 6 and is supported by levitation by the magnetic fluid 4 while the magnetic fluid 4 is brought into contact with the inner peripheral face of the lens barrel 5, to thereby cover the gap between the lens barrels 5 and 6. Also, it is not restricted to the shape as long as it has such a construction that the gap between the lens barrels 5 and 6 is covered by the magnetic fluid 4.

The magnetic circuit forming means according to this embodiment mode is constructed so that the pair of annular magnets 2 and 3 are mutually inversely polarized in the radial direction to be coupled, resulting in that it may be simply constructed, thereby being excellent in its manufacturing property and assembling property.

Also, it maybe structured by, for example, the magnetic circuit forming means comprises an annular magnet (magnetic force producing means) that is polarized in the axial direction and a pair of pole pieces that consists of magnetic substances fixed to both ends of the annular magnet in an axial direction thereof, and a magnetic fluid that is retained on end portions of the pair of pole pieces (magnetic pole units).

(Embodiment Mode 2)

Figure 3:
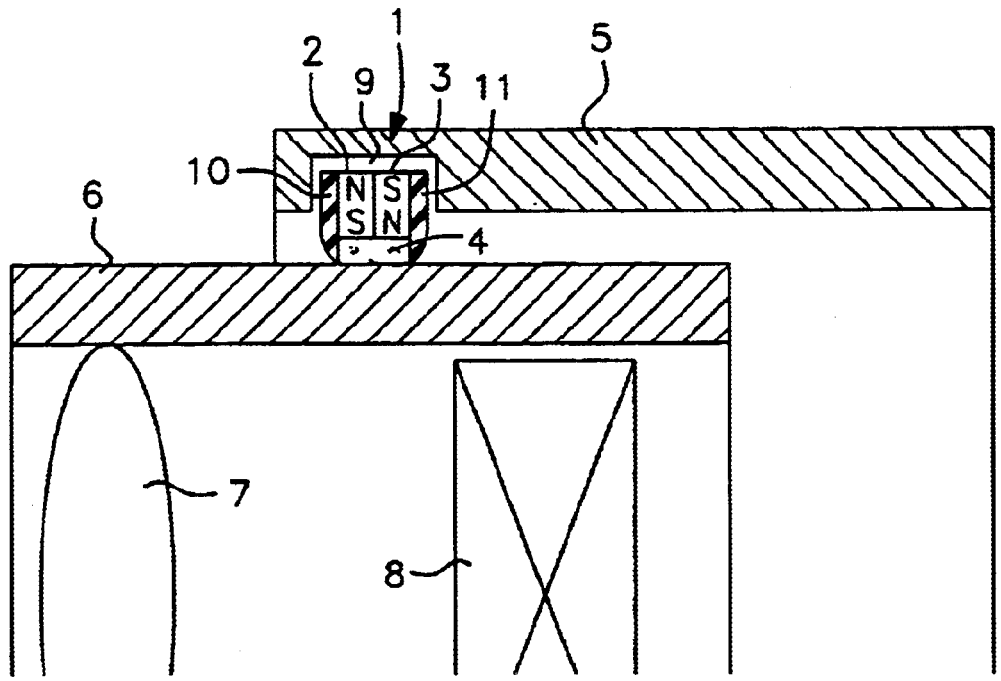
FIG. 3 is a half-sectional view showing a light-shielding device according to Embodiment Mode 2.

FIG. 3 shows Embodiment Mode 2. In this case, a light-shielding device 1 according to Embodiment Mode 2 will be described and the other descriptions regarding the constructions that are same as those according to Embodiment Mode 1 will be omitted by using the same reference numerals.

In the light-shielding device 1 according to Embodiment Mode 2, two assistance shields 10 and 11 (leakage prevention member) that are made of rubber, felt and the like are arranged adjacently at both sides of a pair of annular magnets 2 and 3 in an axial direction thereof.

Thus, in the light-shielding device 1 according to Embodiment Mode 2, the assistance shields 10 and 11 securely prevent the leakage of a magnetic fluid 4 toward an axial direction, which is caused in accordance with relative moving of lens barrels 5 and 6, to thereby improve the light-shielding property.

Note that it is preferable that the assistance shields 10 and 11 are arranged at the positions where those tip ends slightly comes into contact with the lens barrel 6 so that the slide resistance becomes as small as possible.

Also, the assistance shield may be arranged at only one side of either of the pair of annular magnets 2 and 3 in an axial direction thereof, in which the leakage of the magnetic fluid 4 is easily occurred.

In the above embodiment mode, the case where the magnetic fluid sealer is applied as a light-shielding device is described. However, it is also preferably employed as a dust sealer of precision machines such as HDDs or the like that require a shield having a low abrasion to be constructed as the above (In this case, there is not existed a straight gap penetrating from the exterior to the interior and includes a curved gap that is served as a gap 9 between the lens barrel 5 and the pair of annular magnets 2 and 3. It can be employed as long as there is provided with dustproof properties for preventing that dust or the like from the exterior is directly invaded into the interior in a straight manner.).

(Embodiment Mode 3)

In a method for mounting the magnetic fluid sealer having a structure with which the light-shielding device according to the above-described embodiment mode is constructed, when mounting it in a predetermined position, first a member such as a magnetic circuit forming means, for example, such as a magnet, is mounted in the state where magnetic fluids are not retained, and thereafter magnetic fluids are filled in a sealing unit.

However, in such a method of mounting the magnetic fluid sealer, there are some cases where it becomes difficult to perform the filling work of magnetic fluids depending on a portion to be mounted to.

Also, the filling work of magnetic fluids is left to a maker as the purchaser, resulting in that there is a problem in that a filling device of magnetic fluids has to be installed in each of the assembly work sites of the maker as the purchaser.

Further, when the filling work of magnetic fluids is left to a maker as the purchaser, the maker of the magnetic fluid sealer is not capable of managing the filling amount, thereby causing a fear that the management of the filling amount is unsatisfactorily implemented. Thus, it may be considered that there occurs a trouble due to that the light-shielding properties or dust-proof properties are reduced or lost, which results in that the filling amount of magnetic fluids runs short in the time of the mounting work and the like.

Therefore, in this embodiment mode or the follower, a magnetic fluid sealer and a method of mounting the magnetic fluid sealer, in which the above problem can be solved and there is attempted the improvement of the mounting operability and the quality management, will be described.

Incidentally, the descriptions will be also made by using an example in which a magnetic fluid sealer is applied to a light-shielding device in a similar manner to those of Embodiment Modes 1 and 2 in this embodiment mode or the follower.

Figure 4:
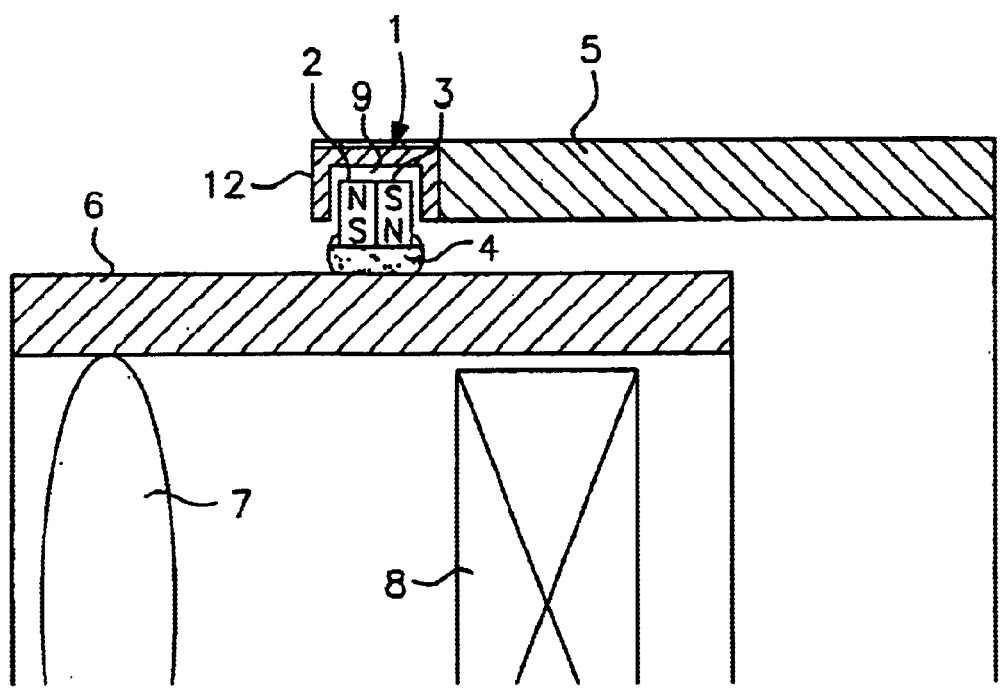
FIG. 4 is a half-sectional view showing a light-shielding device according to Embodiment Mode 3.

FIG. 4 shows Embodiment Mode 3. In this case, a light-shielding device 1 according to Embodiment Mode 3 will be described and the other descriptions regarding the constructions that are same as those according to Embodiment Mode 1 will be omitted by using the same numerals and symbols.

In the light-shielding device 1 according to Embodiment Mode 3, a sleeve 12 that includes an annular fitting groove in which a pair of annular magnets 2 and 3 are arranged so as to be radially movable is provided so as to be separated from a lens barrel 5.

That is, although the fitting groove is formed on the inner peripheral face of the lens barrel 5 so as to come into direct contact therewith in Embodiment Modes 1 and 2, the fitting groove is formed on the inner peripheral face of the sleeve 12 and the sleeve 12 is mounted on the lens barrel 5 in this embodiment mode.

Incidentally, for example, a gap 9 between the outer peripheral face of the pair of annular magnets 2 and 3 that are disposed in the fitting groove and the groove bottom surface of the fitting groove is set in a similar manner to that of Embodiment Mode 1.

Therefore, even in the case where the lens barrel 6 is greatly eccentric to the lens barrel 5, the pair of annular magnets 2 and 3 radially move so that the gap from the lens barrel 6 is kept constant by magnetic levitation force that a magnetic fluid 4 imparts.

In this case, the slide resistance of the light-shielding device 1 is always kept constant regardless of the eccentricity amount of the lens barrel 6 and the gap between the pair of annular magnets 2 and 3 and the lens barrel 6 remains in the state covered by the magnetic fluid 4, thereby being capable of maintaining the light-shielding property in a similar manner to those of Embodiment Modes 1 and 2.

Note that, when the magnetic fluid sealer that is applied to the light-shielding device 1 is employed as a dust sealer of precision machines such as HDDs, there is no gap that penetrates from the exterior into the interior in a straight manner, thereby maintaining dust-proof properties that prevents that dust or the like from the exterior is invaded directly into the interior in a straight manner.

Figure 5:
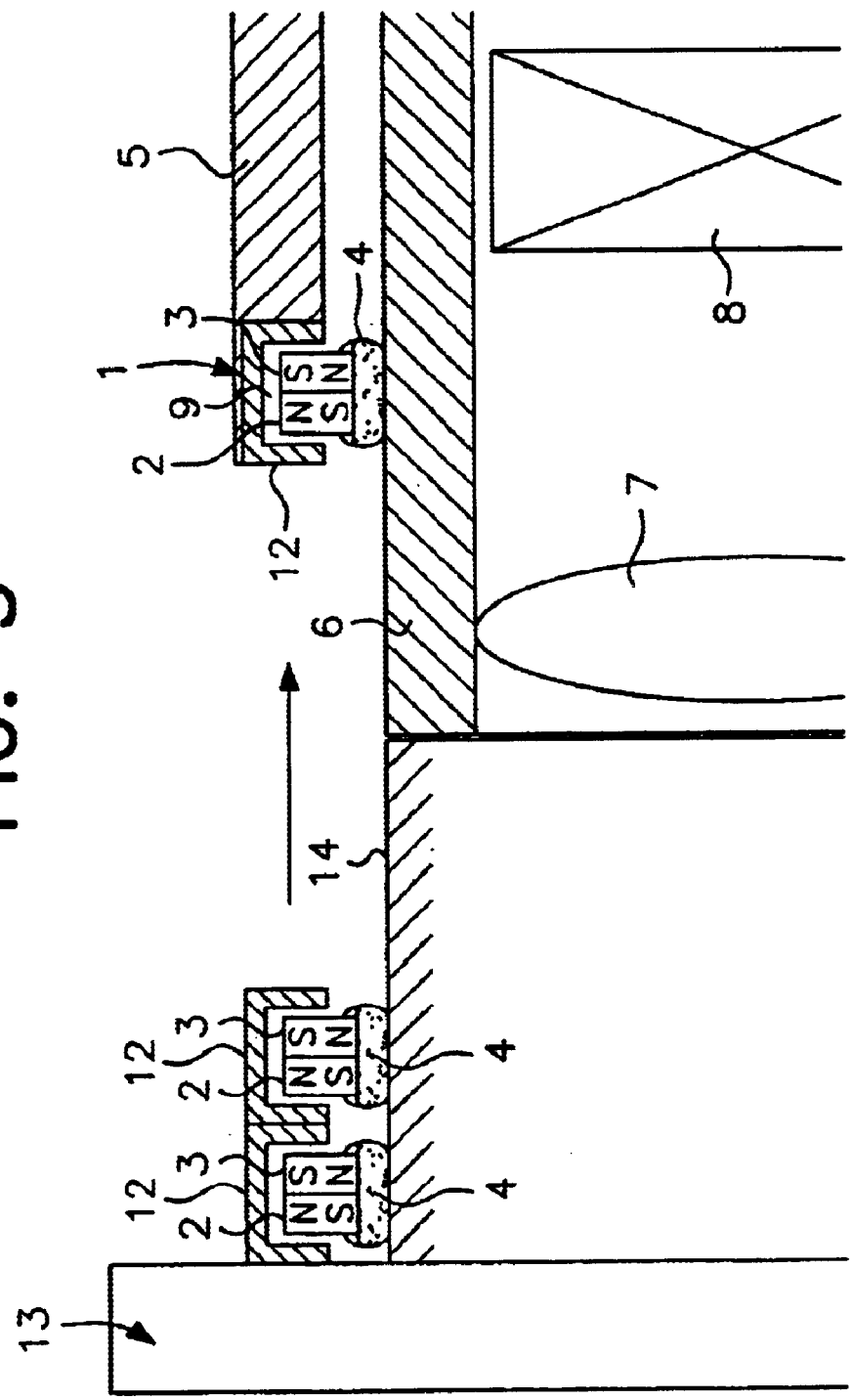
FIG. 5 is a half-sectional view showing a method for mounting the light-shielding device according to Embodiment Mode 3.

Next, FIG. 5 shows a method for mounting the light-shielding device 1 according to this embodiment mode. FIG. 5 is a perspective view showing the mounting state of the light-shielding device 1 according to this embodiment mode.

In this embodiment mode, the pair of annular magnets 2 and 3 are arranged in the fitting groove of the sleeve 12 of the light-shielding device 1, the magnetic fluid 4 is remained in the filled state at the inner peripheral end portion of the pair of annular magnets 2 and 3, and the sleeve 12 in the state where the magnetic fluids has been already filled is mounted to a jig 13 in advance.

Incidentally, the magnetic fluid 4 may be filled after the sleeve 12 is mounted to the jig 13.

In this case, the jig 13 used for this embodiment mode includes an axial shape portion 14 that is served as a magnetic fluid contact portion having a diameter approximately the same as the periphery of the lens barrel 6 and a plurality of sleeves 12 in the state where the magnetic fluids has been already filled as described above are mounted to the axial shape portion 14.

Then, when the light-shielding device 1 is mounted to the predetermined mounting portion, the end portion of the axial shape portion 14 are made to oppose the end portion of the lens barrel 6 in the drawing. While remaining the state, the above-described sleeve 12 in the state where the magnetic fluids has been already filled is slid to the position at which it reaches the mounting portion of the lens barrels 5 and 6 in a direction of the arrow illustrated in the drawing, to thereby perform mounting.

In the mounting portion of the lens barrels 5 and 6, the sleeve 12 is fit to the lens barrel 5, to thereby be fixed.

In this case, it is preferable that the surface of the axial shape portion 14 of the above-described jig 13 remains in the state where wettability with the magnetic fluid 4 jig is degraded. Accordingly, the surface of the axial shape portion 14 is coated with a wettability reducing member in this embodiment mode. As the wettability reducing member, there are illustrated a coupling agent containing fluorine, monomer containing fluorine chain that is easily made into high molecular-weight, an oil repellent agent and the like.

Also, the material having a low wettability may be employed for the jig 13, to thereby degrade the wettability of the surface. As the material having a low wettability, there are illustrated all materials of the so-called PTFE, etc.

Thus, the wettability with the magnetic fluid 4 on the surface of the axial shape portion 14 is degraded, resulting in that the sleeve 12 in the state where the magnetic fluids has been already filled, which is mounted to the jig 13, can prevent the residue of the magnetic fluid 4 at the jig 13 side, which is caused by adhesion of the magnetic fluid 4 to the axial shape portion 14. Therefore, the filling amount of the magnetic fluid 4 can be precisely managed before mounting.

Additionally, it is preferable that the outer peripheral face of the lens barrel 6 also remains in the state where the wettability with the magnetic fluid 4 is degraded. This case can also prevent the mounting residue caused at the time when the sleeve 12 in the state where the magnetic fluids has been already filled is slid from the jig 13 to the lens barrel 6.

Thus, in this embodiment mode, the filling work of the magnetic fluid 4 can be implemented before mounting to the jig 13 or while mounting it, thereby easily performing the filling work of the magnetic fluid 4 regardless of the structure of the device or the like of the maker desiring for mounting.

Also, when the mounting work of the sleeve 12 that is mounted to the jig 13 is implemented, the sleeve 12 in the state where the magnetic fluids has been already filled just has to be slid, to thereby easily perform such a work.

Further, the maker of the light-shielding device 1 can execute the filling work of the magnetic fluid 4, and therefore the filling device has to be installed only in the maker. Additionally, the maker of the light-shielding device 1 can manage the filling amount of the magnetic fluid 4. As a result, the quality management is implemented in a satisfactory manner.

Note that, the surface shape of the magnetic fluid contact portion of the jig may be formed so as to be same as the surface shape in contact with the magnetic fluid 4 at the time of mounting. For example, the pair of annular magnets 2 and 3 are arranged in the fitting groove of the sleeve 12 that is provided on the outer peripheral face of the internal lens barrel 6 and are supported by levitation by the magnetic fluid 4 with which the inner peripheral face of the lens barrel 5 comes into contact, the magnetic fluid contact portion of the jig 13 is formed at a hole portion or a barrel portion having an internal circumference that is approximately same as that of the lens barrel 5 in the case of the light-shielding device 1 having a structure such that the gap between the lens barrels 5 and 6 is covered.

(Embodiment Mode 4)

Figure 6:
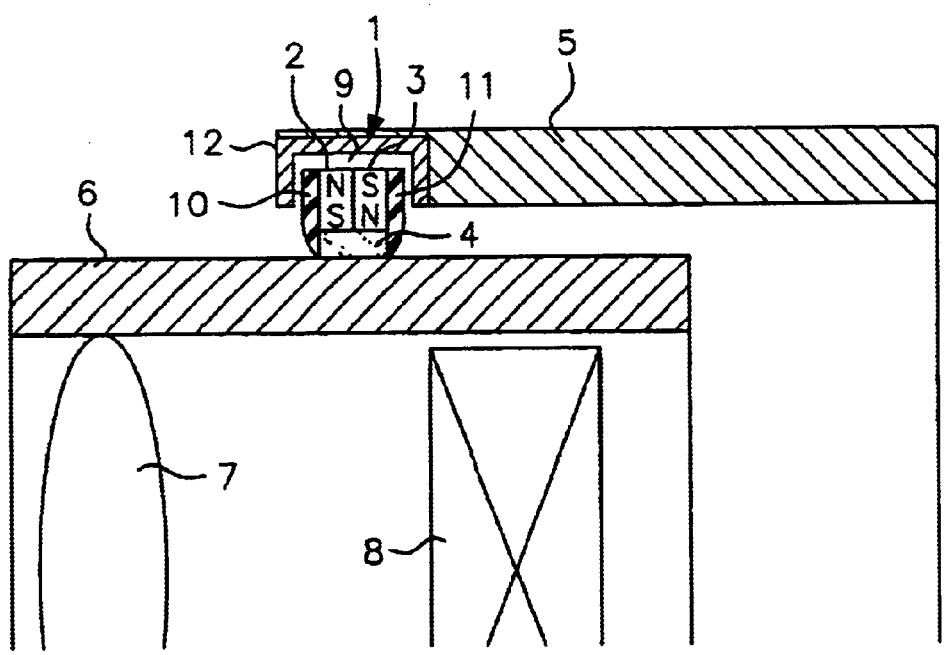
FIG. 6 is a half-sectional view showing a light-shielding device according to Embodiment Mode 4.
Figure 7:
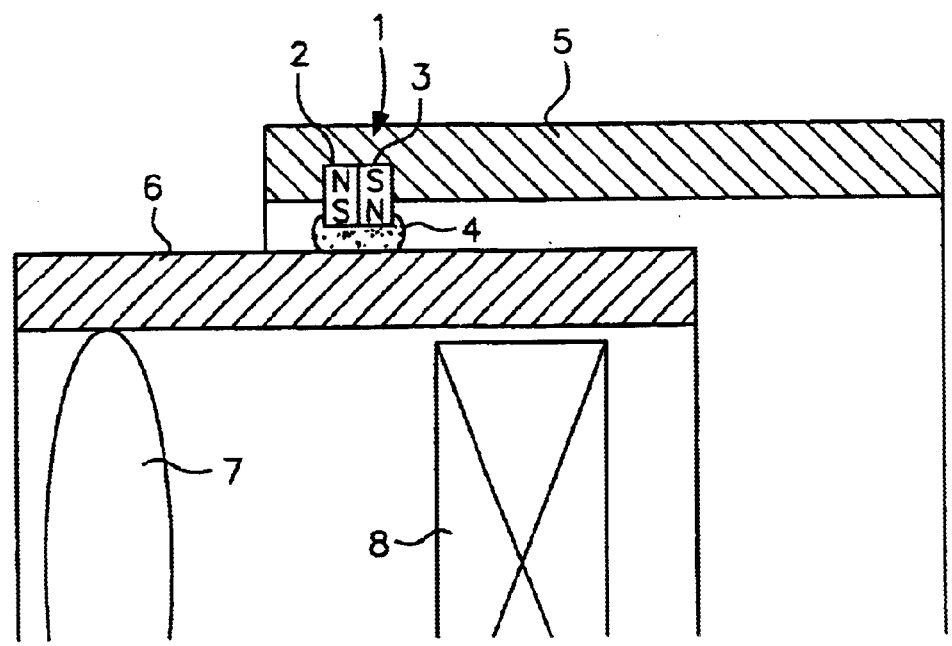
FIG. 7 is a half-sectional view showing a light-shielding device of a conventional technique.
Figure 8:
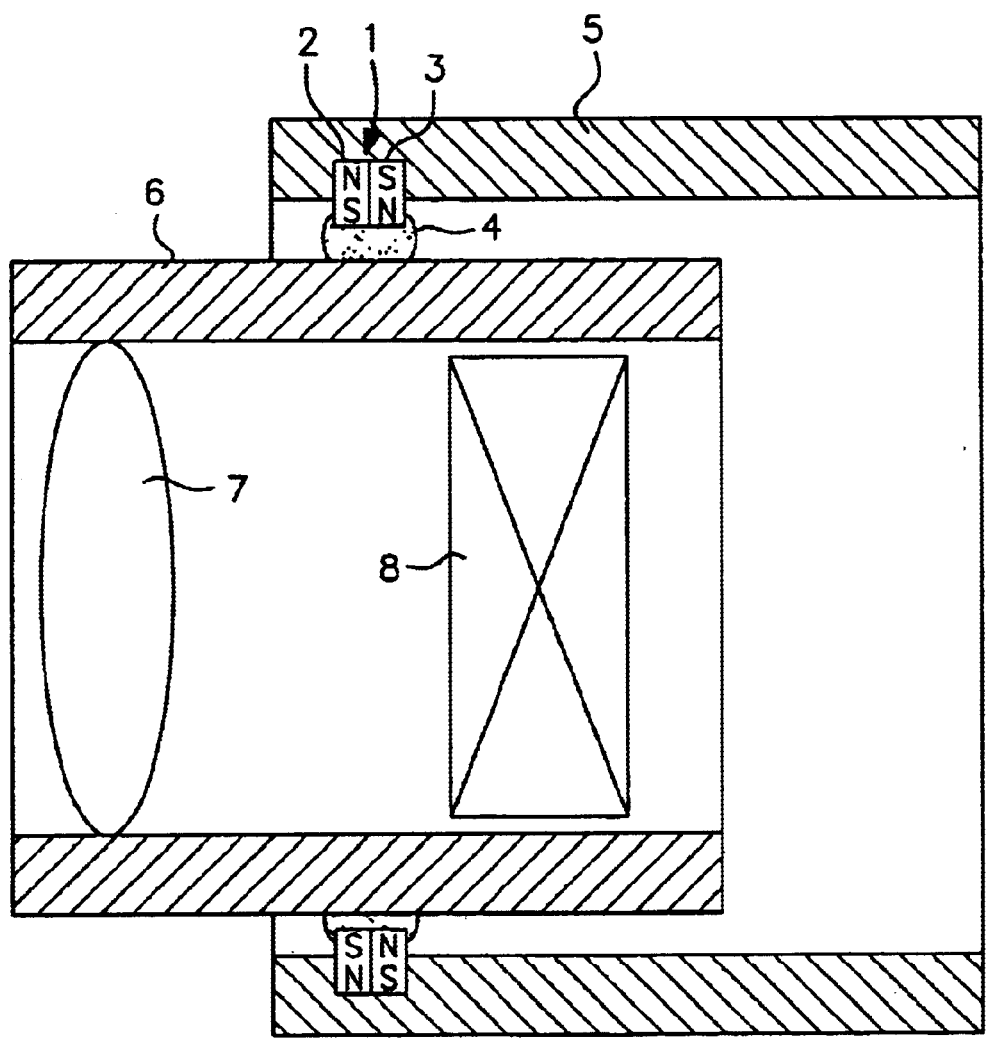
FIG. 8 is a sectional view showing an eccentric state of the light-shielding device of a conventional technique.
Figure 9:
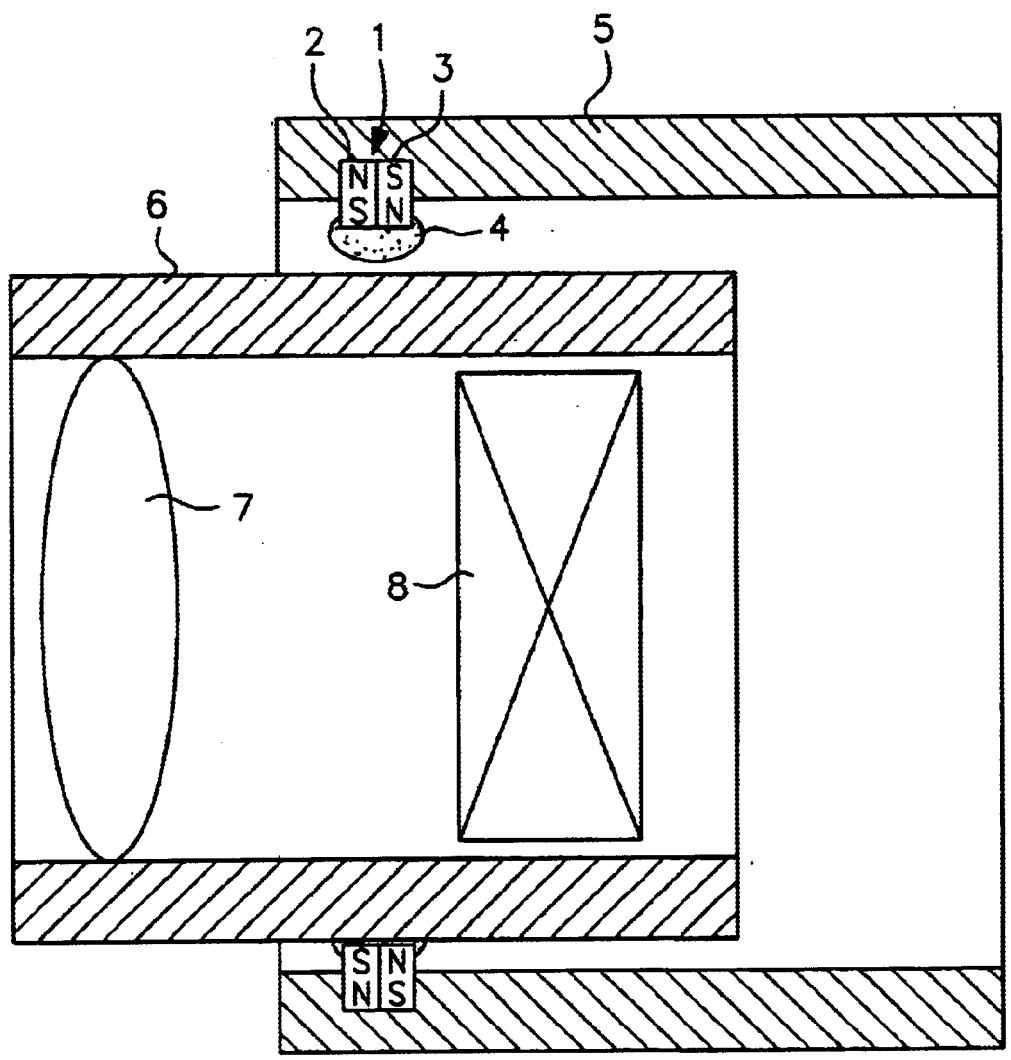
FIG. 9 is a sectional view showing a state where leakage of light is caused in an eccentric state of the light-shielding device of a conventional technique.

FIG. 6 shows Embodiment Mode 4. In this case, a light-shielding device 1 according to Embodiment Mode 4 will be described and the other descriptions regarding the constructions that are same as those according to Embodiment Mode 3 will be omitted by using the same numerals and symbols.

In the light-shielding device 1 according to Embodiment Mode 4, like Embodiment Mode 2, two assistance shields 10 and 11 (leakage prevention member) that are made of rubber, felt, non-woven fabric or the like are arranged adjacently at both sides of a pair of annular magnets 2 and 3 in an axial direction.

The assistance shields 10 and 11 are arranged in a fitting groove of a sleeve 12 integrally with the pair of annular magnets 2 and 3.

Thus, in the light-shielding device 1 according to Embodiment Mode 4, the assistance shields 10 and 11 securely prevent the leakage of a magnetic fluid 4 toward an axial direction, which is caused in accordance with relative moving of lens barrels 5 and 6, to thereby improve the light-shielding property. Also, entering of foreign materials into the magnetic fluid 4 from the exterior thereof can be also securely prevented.

Note that it is preferable that the assistance shields 10 and 11 are arranged at the positions where those tip ends slightly come into contact with the lens barrel 6 so that the slide resistance becomes as small as possible.

Also, the assistance shield may be arranged at only one side of either of the pair of annular magnets 2 and 3 in an axial direction thereof, in which the leakage of the magnetic fluid 4 is easily occurred or the magnetic fluid 4 is easily contaminated by foreign materials from the exterior thereof.

Even in the light-shielding device 1 according to this embodiment mode described above, a method for mounting the light-shielding device 1, which is similar to that of Embodiment Mode 3, is applicable, to thereby become capable of attempting the improvement of the mounting operability and the quality management.

INDUSTRIAL APPLICABILITY

As described above, according to the present invention, a magnetic circuit forming means is provided so as to be relatively movable in response to an interval change of a gap. Therefore, even when the interval change of the gap between the two members is caused due to eccentricity or the like, the gap between the magnetic circuit forming means that retains magnetic fluids and one of the two members can be kept constant. Thus, the area in which the magnetic fluid is in contact with one of the members is not enlarged, whereby the slide resistance of a magnetic fluid sealer can be always kept constant regardless of the eccentricity amount.

Accordingly, the light-shielding property can be maintained even in the case where the interval change of the gap is large, without enlarging a magnetic force producing means in response to the eccentricity amount to obtain increased magnetic force or increasing the amount of the magnetic fluid.

The magnetic circuit forming means is provided so as to be movable in a vertical direction with respect to one of the two members, within a fitting groove that is provided in the other one of the two members. Therefore, the magnetic circuit forming means is supported by levitation from one of the members by magnetic levitation force which the magnetic fluid imparts in the fitting groove. Even in the eccentric state, the magnetic circuit forming means can be radially move so as to keep a constant gap from one of the members with the magnetic fluid.

A leakage prevention member for preventing a leakage of the magnetic fluid in an axial direction is provided in at least one of the side surfaces of the magnetic circuit forming means in an axial direction, resulting in that a leakage of the magnetic fluid in an axial direction can be prevented by the leakage prevention member.

The surface of one of the members is coated with a wettability reducing member for reducing wettability with the magnetic fluid. Therefore, the magnetic fluid that is in contact with one of the members can be prevented from wetting the surface of one of the members, thereby being capable of preventing reduction in the amount of the magnetic fluid that is retained in magnetic pole units, so that light-shielding can be performed for a long period of time.

The magnetic circuit forming means is provided in a manner such that a pair of magnetic pole units are formed in a pair of magnetic force producing means that are coupled while being mutually inversely polarized. Thus, the magnetic circuit forming means may be simply constructed, thereby being excellent in its manufacturing property and assembling property.

The magnetic fluid sealer is disposed in a zoom lens unit of a camera. Accordingly, the slide resistance of the zoom lens unit of the camera can be reduced, the power consumption amount that is required for performing zooming with the zoom lens unit or the like may also be reduced, thereby being capable of attaining power conservation of the camera, and eccentricity following property of the zoom lens unit is enhanced to save space thereof, thereby being capable of achieving miniaturization of the camera.

A sleeve mounted to the other one of the two members and in which a fitting groove is formed at the position opposing one of the members is provided, and the magnetic circuit forming means is arranged in the fitting groove of the sleeve so as to be movable in a vertical direction with respect to one of the members. Therefore, the magnetic circuit forming means is supported by levitation from one of the members by magnetic levitation force which the magnetic fluid imparts in the fitting groove of the sleeve. Even in the eccentric state, the magnetic circuit forming means can radially move so as to keep a constant gap from one of the members with the magnetic fluid.

Accordingly, the area in which the magnetic fluid is in contact with one of the members is not enlarged, and the slide resistance of the magnetic fluid sealer can be always kept constant regardless of the eccentricity amount, so that light-shielding property or dust-proof property can be maintained even in the case where the interval change of the gap is large.

A leakage prevention member for preventing a leakage of the magnetic fluid in an axial direction is provided in at least one of the side surfaces of the magnetic circuit forming means in an axial direction, so that a leakage of the magnetic fluid in an axial direction can be prevented by the leakage prevention member. Further, entering of foreign materials into the magnetic fluid from the outside can be also securely prevented.

The sleeve in which retaining of the magnetic fluid and disposing of the magnetic circuit forming means into the fitting groove have been completed is mounted in advance to a jig having a magnetic fluid contact portion whose surface configuration is substantially the same as that of one of the members, and the sleeve is slid to a mounting portion of the two members while making an end portion of the magnetic fluid contact portion of the jig be opposed to an end portion of the one of the members, to thereby mount it to the other one of the members. Thus, prior to mounting to the mounting portion of the two members, the magnetic fluid can be filled in advance. Then, mounting can be effected by simply sliding the sleeve to the mounting portion, thereby achieving excellent mounting operability. Also, the manufacturer of the magnetic fluid sealer can fill magnetic fluids in advance before shipping the magnetic fluid sealer, so that the manufacturer of the magnetic fluid sealer can manage the filling amount of magnetic fluids.

The surface of the magnetic fluid contact portion of the jig remains in the state in which its wettability with magnetic fluids has been reduced. Accordingly, adherence of magnetic fluids with respect to the magnetic fluid contact portion of the jig can be reduced, thereby being capable of strict managing the filling amount of magnetic fluids before performing mounting.

The magnetic circuit forming means is provided in a manner such that the pair of magnetic pole units are formed in a pair of the magnetic force producing means that are coupled while being mutually inversely polarized in a vertical direction with respect to the one of the members. Therefore, the magnetic circuit forming means may be simply constructed, thereby being excellent in its manufacturing property and assembling property, while at the same time being capable of producing intense magnetic force.

What is claimed is:

1. A magnetic fluid sealer that is provided in a gap between two members mounted so as to be relatively movable with respect to each other, said magnetic fluid sealer comprising:

a magnetic circuit forming means which includes a magnetic force producing means for producing magnetic force, and forms a magnetic circuit that passes through said gap; and a magnetic fluid that is magnetically retained by magnetic flux passing through said gap of the magnetic circuit formed by the magnetic circuit forming means, which contacts with one of the two members to thereby seal said gap;

a sleeve mounted to the other one of the two members and in which a fitting groove is formed at a position opposing the one of said members; and said magnetic circuit forming means being supported by levitation from the one of said members by magnetic levitation force that said magnetic fluid imparts and being arranged in the fitting groove of the sleeve so as to be movable in a vertical direction with respect to the one of said members, said magnetic fluid being retained in said sleeve and said magnetic circuit forming means being disposed into said fitting groove in said sleeve prior to mounting the magnetic fluid sealer between the two members.

2. The magnetic fluid sealer according to claim 1, wherein a leakage prevention member for preventing a leak of said magnetic fluid in an axial direction is provided in at least one of the side surfaces of said magnetic circuit forming means in an axial direction.

3. The magnetic fluid sealer according to claim 1, wherein, when mounting the magnetic fluid sealer between the two members:

said sleeve in which retaining of said magnetic fluid and disposing of said magnetic circuit forming means into said fitting groove have been completed is mounted in advance to a jig having a magnetic fluid contact portion whose surface configuration is substantially the same as that of the one of said members; and said sleeve is slid to a mounting portion of the two members while making an end portion of the magnetic fluid contact portion of said jig be opposed to an end portion of the one of said members, to thereby mount it to the other one of said members.

4. The magnetic fluid sealer according to claim 3, wherein the surface of the magnetic fluid contact portion of said jig remains in the state in which its wettability with magnetic fluids has been reduced.

5. The magnetic fluid sealer according to claim 1, wherein said magnetic circuit forming means is provided in a manner such that a pair of magnetic poles are formed in a pair of magnetic force producing means that are coupled while being mutually inversely polarized in a vertical direction with respect to the one of said members.

6. A method for mounting a magnetic fluid sealer between two members, the magnetic fluid sealer that is provided in a gap between the two members mounted so as to be relatively movable with respect to each other and comprising: a magnetic circuit forming means which includes a magnetic force producing means for producing magnetic force and forms a magnetic circuit that passes through said gap; a magnetic fluid that is magnetically retained by magnetic flux passing through said gap of the magnetic circuit formed by the magnetic circuit forming means, which contacts with one of the two members to thereby seal the gap; and a sleeve mounted to the other one of the two members and in which said magnetic circuit forming means is disposed, said method comprising:

mounting in advance said sleeve in which retaining of said magnetic fluid and disposing of said magnetic circuit forming means have been completed, to a jig having a magnetic fluid contact portion whose surface configuration is substantially the same as that of the one of said members; and sliding said sleeve to a mounting portion of the two members while making an end portion of the magnetic fluid contact portion of said jig be opposed to an end portion of the one of said members, to thereby mount it to the other one of said members.

7. The method for mounting a magnetic fluid sealer according to claim 6, wherein the surface of the magnetic fluid contact portion of said jig remains in a state in which wettability with magnetic fluids has been reduced.

8. The method for mounting a magnetic fluid sealer according to claim 6, wherein a fitting groove is formed in said sleeve at a position opposing the one of said members and that said magnetic circuit forming means is arranged in the fitting groove of said sleeve so as to be movable in a vertical direction with respect to the one of said members.

9. The method for mounting a magnetic fluid sealer according to claim 6, wherein a leakage prevention member for preventing a leakage of said magnetic fluid in an axial direction is provided in at least one of the side surfaces of said magnetic circuit forming means in an axial direction.

10. A magnetic fluid sealer that is provided in a gap between two members mounted so as to be relatively movable with respect to each other, said magnetic fluid sealer comprising:

a magnetic circuit forming means which includes a magnetic force producing means for producing magnetic force, and forms a magnetic circuit that passes through said gap; and a magnetic fluid that is magnetically retained by magnetic flux passing through said gap of the magnetic circuit formed by the magnetic circuit forming means, which contacts with one of the two members to thereby seal said gap;

a sleeve mounted to the other one of the two members and in which a fitting groove is formed at a position opposing the one of said members; and said magnetic circuit forming means being arranged in the fitting groove of the sleeve so as to be movable in a vertical direction with respect to the one of said members, and when mounting the magnetic fluid sealer between the two members:

said sleeve in which retaining of said magnetic fluid and disposing of said magnetic circuit forming means into said fitting groove have been completed is mounted in advance to a jig having a magnetic fluid contact portion whose surface configuration is substantially the same as that of the one of said members, and said sleeve is slid to a mounting portion of the two members while making an end portion of the magnetic fluid contact portion of said jig be opposed to an end portion of the one of said members, to thereby mount it to the other one of said members.

11. The magnetic fluid sealer according to claim 10, wherein the surface of the magnetic fluid contact portion of said jig remains in a state in which its wettability with magnetic fluids has been reduced.

* * * * *